US007613935B2

United States Patent
Schumacher et al.

(10) Patent No.: US 7,613,935 B2
(45) Date of Patent: Nov. 3, 2009

(54) POWER MONITORING FOR PROCESSOR MODULE

(75) Inventors: Derek Steven Schumacher, Auburn, CA (US); Idis Ramona Martinez, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 11/192,735

(22) Filed: Jul. 29, 2005

(65) Prior Publication Data

US 2007/0028129 A1    Feb. 1, 2007

(51) Int. Cl.
*G06F 1/00*    (2006.01)
*G06F 1/26*    (2006.01)
*G06F 1/32*    (2006.01)

(52) U.S. Cl. ................. 713/300; 713/320; 713/322; 713/324

(58) Field of Classification Search ................. 713/300, 713/320, 322, 340, 324
See application file for complete search history.

(56) References Cited

U.S. PATENT DOCUMENTS

| 6,172,611 | B1 * | 1/2001 | Hussain et al. | 340/584 |
|---|---|---|---|---|
| 6,574,740 | B1 * | 6/2003 | Odaohhara et al. | 713/323 |
| 6,879,489 | B2 * | 4/2005 | Koertzen | 361/704 |
| 6,895,479 | B2 * | 5/2005 | Reimer et al. | 711/152 |
| 6,950,950 | B2 * | 9/2005 | Sawyers et al. | 713/300 |
| 6,986,069 | B2 * | 1/2006 | Oehler et al. | 713/320 |
| 7,243,243 | B2 * | 7/2007 | Gedeon | 713/300 |
| 2004/0034749 | A1 | 2/2004 | Jeddeloh | |
| 2004/0123170 | A1 * | 6/2004 | Tschanz et al. | 713/320 |
| 2004/0123171 | A1 * | 6/2004 | Zhang et al. | 713/322 |
| 2004/0225801 | A1 | 11/2004 | Scordalakes et al. | |
| 2004/0225802 | A1 | 11/2004 | Krishnamurthy et al. | |
| 2004/0260853 | A1 | 12/2004 | Cho | |
| 2006/0095807 | A1 * | 5/2006 | Grochowski et al. | 713/324 |
| 2006/0184287 | A1 * | 8/2006 | Belady et al. | 700/291 |
| 2007/0011480 | A1 * | 1/2007 | Banginwar et al. | 713/323 |

* cited by examiner

*Primary Examiner*—Mark Connolly

(57) ABSTRACT

A processor module includes an execution unit and a power monitor for monitoring power consumption by processor components including said execution unit.

14 Claims, 3 Drawing Sheets

POWER MONITORING FOR PROCESSOR MODULE

BACKGROUND OF THE INVENTION

The present invention relates to computers and, more particularly, to computer processor modules for computers. In this specification, related art labeled "prior art" is admitted prior art; related art not labeled "prior art" is not admitted prior art.

Computers typically include processors, solid-state and disk-based memory, input-output devices and interfaces therefor. Moreover, many computers are expandable and/or upgradeable. Accordingly, computers are typically provided with power supplies that can not only handle the maximum power required by the computer in its initial configuration, but also allow leeway for added and upgraded components that may require additional power. Generally, the power supply for a computer can be selected to handle the total of the maximum power required of the pre-installed components plus a margin for added and upgraded components.

SUMMARY OF THE INVENTION

In the course of the present invention, it was recognized that budgeting power to meet maximum demands can be wasteful as not all components are operated at maximum power at all times. This is all the more the case as some manufacturers assign a nominal maximum power requirement higher than actual maximum power requirements, e.g., to avoid blame when failures occur due to insufficient power.

Accordingly, the present invention, as defined in the claims, provides a processor module with power-consumption monitoring. This allows the actual power consumed by a processor to be determined dynamically. Information on actual power as opposed to nominal ratings reduces the tolerances required for power budgeting. As heat dissipation is related to power consumption, the invention also allows more modest provisions for heat removal.

The invention provides for actual and therefore more accurate power consumption data than is available using only nominal power ratings, theoretical power consumption values, or even empirical data determined upon design and/or verification (as power consumption can change over a device lifetime). Certain embodiments of the invention permit action to be taken to reduce power consumption when it is too high; for example, the clock rates of some processors can be reduced to lower their power consumption. These embodiments permit further reductions in the tolerances for power budgeting. Generally, the invention provides a more favorable tradeoff between cost (e.g., relating to the power supply and heat removal) and functionality. These and other features and advantages of the invention are apparent from the description below with reference to the following drawings.

DETAILED DESCRIPTION

Figure 1:
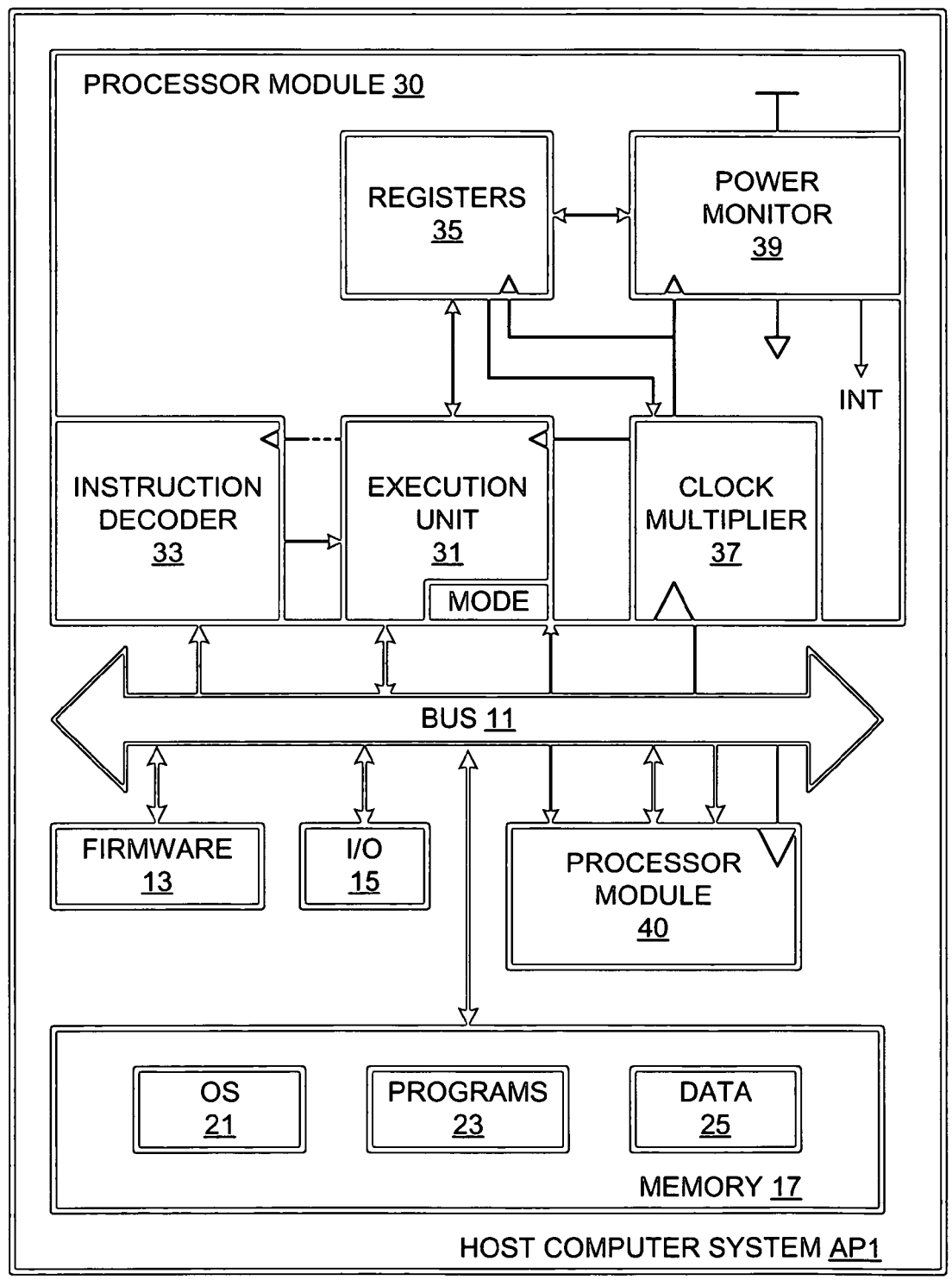
FIG. 1 is a schematic diagram of a computer system incorporating one of many processor modules within the scope of the invention.

One of many possible systems provided for by the present invention, host computer system AP1 includes processor modules 30 and 40, a system bus 11, firmware 13, input and output (I/O) devices 15, and memory 17, as well as other components as understood by those skilled in the art. Memory 17, which includes both solid-state and disk-based memory, stores an operating system 21, other programs 23, and data 25. Firmware 13 guides power-on operations and provides low-level functionality for system AP1. I/O devices 15 provide for interfacing with networks, other devices, and humans (e.g., via keyboards and displays).

Processor module 30 includes an execution unit 31, an instruction decoder 33, registers 35, a clock multiplier 37, and a power monitor 39, as well as other functional components as understood by those skilled in the art. Processor module 30 manipulates data in accordance with program instructions, e.g., of operating system 21 and programs 23. The instructions are decoded by instruction decoder 33 for execution by execution unit 31, which can include multiple functional subunits so that instructions can be executed in parallel. Registers 35 provide short term storage for data being manipulated by execution unit 31.

The operations conducted by the various components of processor module 30 are performed in discrete steps synchronized by clock signals distributed by clock multiplier 37. Clock multiplier 37 receives a system clock signal having a certain clock frequency and derives internal clock signals, typically simple multiples of the system clock frequency at predetermined phases with respect to each other.

Power monitor 39 is coupled to the power and ground supplies to processor module 30 for monitoring power consumption thereby. In practice, there can be many power lines and ground lines. Depending on the embodiment, all power and ground lines can be monitored, or just some of them can be monitored. Power monitor 39 determines power consumption as a function of time and associates the power consumption at a given time with the present time of year and present configuration such as the multiplier applied by clock multiplier 37. The power consumption data is accessible via execution unit 31 in response to program instructions, e.g., a system resource monitor running in the background.

If the power consumption data indicates a problem that needs to be addressed, power monitor 39 can trigger a warning, e.g., in the form of an interrupt. The conditions that trigger the warning can be programmed via execution unit 31. For example, a power monitor console program can allow a user to specify power consumption thresholds that, when exceeded, cause a warning to be issued. Depending on the situation, the warning can result in automatic protective or corrective action, or in a notice to a user that such action is required.

The rate at which operations are performed can be controlled either by adjusting the system clock rate or by selecting a different base multiple to be applied by clock multiplier 37. Typically, a higher clock rate implies greater power consumption, so reducing the clock rate can save power and reduce heat dissipation. Power consumption can also be reduced by disabling one or more execution subunits of execution unit 31, which, of course, can incur a performance penalty. Depending on how power monitor 39 is configured, an action such as reducing the clock rate or disabling execution subunits (e.g., using a "mode" input) can be effected automatically or with human intervention.

Processor module 30 is an integrated circuit package with a single integrated circuit incorporating execution unit 31, instruction decoder 33, registers 35, clock multiplier 37, and power monitor 39. In contrast, processor module 40, shown in greater detail in FIG. 2, includes a processor 42 and a separate voltage regulator 44 both mounted on a carrier 46, e.g., a daughterboard that can be plugged into a mating socket on a motherboard of host computer system AP1. Processor 42 is an integrated circuit package including components corresponding to those for processor module 30, except for the absence of an on-chip power monitor.

In the case of processor module 40, the power monitor 49 is built into the voltage regulator 44. Voltage regulator 44 provides precise voltages to processor 42 via conductors in carrier 46. As the voltage regulator is used solely to power processor 42, the incorporated power monitor can monitor power consumption by processor 42 independently of other components of host computer system AP1.

Power monitor 49 is coupled to processor 42 to receive configuration information therefrom. The configuration information can include clock multiplier settings and indicate what execution subunits are active. In addition, processor 42 can read power-consumption data from power monitor 49 and write configuration data, e.g., warning thresholds, to it.

Power monitor 49 can be a field-programmable gate array (FPGA) built into voltage regulator 44. In other embodiments, a power monitor can be an independent integrated circuit, e.g., a FPGA or application-specific integrated circuit (ASIC). For example, in a power module with a processor and voltage regulator on a common carrier, the power monitor can be mounted on the carrier, electrically between the voltage regulator and the processor.

Figure 2:
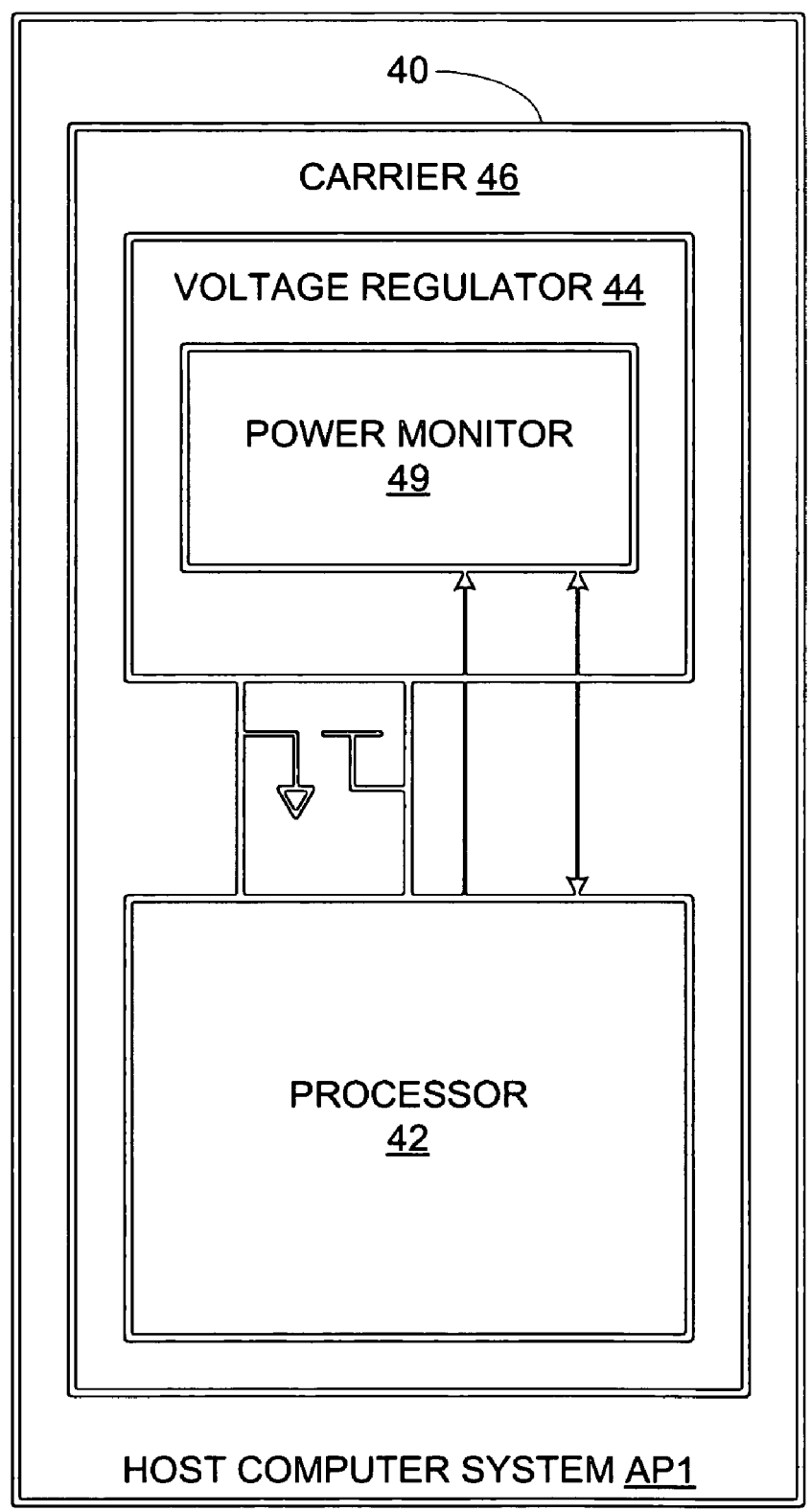
FIG. 2 is a detailed schematic diagram of one of many possible processor modules incorporable in the system of FIG. 1.

The representations of power and ground in FIGS. 1 and 2 are simplified in that there can be many power lines and ground lines, and the power lines can be at different voltages. Power monitors 39 and 49 can monitor all such lines or some of the lines. For example, a single ground line can suffice, and a subset of existing power lines can suffice to provide an accurate representation of overall power consumption.

Figure 3:
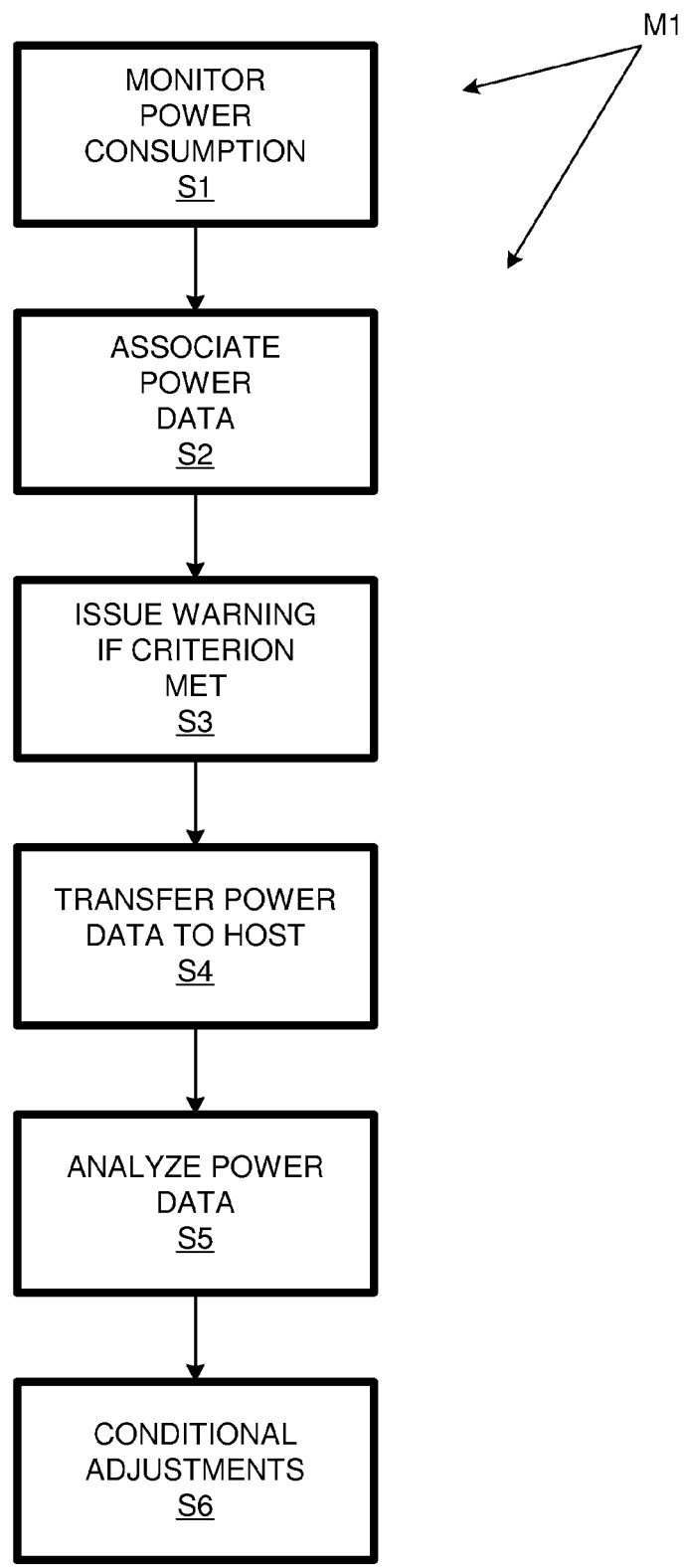
FIG. 3 is a flow chart of one of many methods within the scope of the invention.

One of many possible methods provided by the invention is flow charted in FIG. 3. Method M1 begins with a method segment S1 in which power consumption is monitored. Both power monitors 39 and 49 generate analog representation of power consumed for each power line they monitor. The analog representations are converted to digital data.

At method segment S2, the raw power monitor data is manipulated, associated, and stored. Power monitors 39 and 49 include sensors that generate analog signals corresponding to power consumption. Optionally, these signals can be combined across sensors in the analog domain. After an analog-to-digital conversion, context data can be associated with the power consumption data. For example, the power consumption data can be time stamped so that a power-consumption versus time determination can be made. Power monitors 39 and 49 include time-of-year clocks for providing the time-stamp data. In addition, processor configuration data (e.g., provided via execution unit 31) can be associated with the power data. For example, multiplier settings and the active/inactive status of execution subunits can be associated with power settings. In the illustrated embodiment, the power and associated data are stored locally within power monitors 39 and 49.

At method segment S3, recently acquired power data is compared with a warning criterion and a warning is issued if the criterion is met. The criterion can be multi-part. For example, different thresholds can be assigned to different possible processor configurations or clock multipliers. In this vein, a level of power consumption that would be expected if execution unit 31 were fully activated might be considered indicative of a problem if some of its subunits were disabled. Likewise, a level of power consumption associated with a high clock multiplier might result in a warning when the multiplier is set low. The warning can be in the form of an interrupt. Alternatively, other warning signals can be used.

At method segment S4, power data stored in a power monitor is transmitted for analysis to the host computer system. Typically, the transfer is governed by a software program running in the background, e.g., in association with operating system 21. Alternatively, firmware 13 can manage the power data. Also, the power data can be managed by a combination of firmware and software. One purpose of the transfer is to free limited local storage for capturing more recent power data while archiving old power data. This routine data collection can also involve analysis that can lead to predictions of failure, followed by actions to address a potential failure. The data transfer can also be in response to a warning signal issued at method segment S3 so that the basis of the warning can be identified and any associated problem diagnosed.

Analysis is performed at method segment S5. For each power monitor, the data can be subject to trending and other statistical analysis. Furthermore, data can be combined across power monitors, e.g., so that that total power consumption for processor modules 30 and 40 can be determined and compared with a power threshold budgeted for the processors. If there are other processor modules, monitor data (or data obtained otherwise, e.g., using nominal values) can be combined across modules for power budgeting. This combining can be extended across other types of components such as memory and I/O devices to obtain a comprehensive determination of power consumption. A more comprehensive determination can allow more effective allocation of available power.

Adjustments and corrective action can be effected at method segment S6. For example, if the analysis performed at step S5 indicates that a power budget is exceeded, the multiplier or configuration for a processor can be changed to reduce power consumption. Conversely, if power consumption is well within budget, a processor can be configured to increase performance (if it is not already operating at maximum capability). In a multi-processor system, additional processor modules can be activated if the previously active processor modules are within budget.

If the analysis indicates the presence or likelihood of a problem, method segment S6 provides for protective and/or corrective action. In most cases, this can involve sending a notice to a user or administrator. However, in some cases, host computer system AP1 can act automatically. A third possibility is that a notice is sent to an automated management system networked with host computer system AP1, wherein the management system effects protective and/or corrective action. In extreme cases, host computer system AP1 can be shut down for repair and/or component replacement. Otherwise, some change in the configuration of a processor module can be implemented while allowing continued operation. Clearly, there is a range of possible actions that can be taken either automatically or with human intervention.

The present invention provides for single processor systems and multiprocessor systems. In either case, single core and multi-core processors are provided for. Power monitors can be provided for each core, or for each processor, or a power monitor can be shared by two or more processors.

A power monitor can be "on board", i.e., built into a processor, or "out board", i.e., be external to the processor. In the latter case, the monitor can be a separate entity on a common integrated circuit or it can be separate from the integrated circuit on which a processor is defined. If separate, the monitor can be packaged with the processor or be separate from the processor package. As with processor module 40, the monitor can be built into a separate device such as a voltage regulator, or be an independent component.

The invention provides for various types of communication with the processor module being monitored. For example, memory associated with a power monitor can be within the address space or register space of a processor so that conventional program instructions can be used to configure the power monitor, indicate processor configuration to the power monitor, and access data stored by the power monitor. Alternatively, the power monitor can have a separate interface to firmware so that data communication does not compete with programs for instruction cycles.

The invention provides for parameters other than power consumption to be monitored and the results combined with the power consumption data in a variety of ways. For example, temperature can be monitored to identify areas of high local heat. Power consumption thresholds for hot regions can be lowered to limit further heat buildup. In systems in which processor performance must be limited due to power budget constraints, the available processing performance can be shifted to processors in cooler areas without penalizing overall performance. Performance can be monitored so that more intelligent tradeoffs can be made between power consumption and performance. These and other variations upon and modifications to the present invention are provided for by the present invention as defined by the following claims.

What is claimed is:

1. A method comprising:
   a voltage regulator comprising a monitor for providing power to and monitoring power consumption by a processor;
   storing timestamp data, power consumption data, and power settings associated with a processor mode in said monitor;
   selecting the mode of said processor as a function of said power-consumption data; and
   issuing a warning when said power-consumption data meets a warning criterion.

2. A method as recited in claim 1 wherein said mode affects the duration of an instruction cycle.

3. A method as recited in claim 1 wherein said mode affects a parallelism achieved by said processor module.

4. A method as recited in claim 1 wherein said warning is in the form of a processor interrupt.

5. A method as recited in claim 4 wherein said voltage regulator monitors said power consumption by said processor independently of other components of a host computer system.

6. A computer system comprising:
   memory for storing instructions and data;
   a processor module including an execution unit for manipulating said data according to said instructions; and
   a voltage regulator for delivering power to said processor, said voltage regulator including a power-consumption monitor for generating time-stamp data, and storing power-consumption data representing consumption of power by said processor, said time-stamp data, and processor configuration data associated with said power-consumption data.

7. A computer system as recited in claim 6 wherein said processor module includes a clock multiplier with a programmable multiplier mode, said power-consumption monitor associating data representing a mode of said multiplier with said power-consumption data.

8. A computer system as recited in claim 6 wherein said power monitor monitors said power consumption by said processor independently of other components of a host computer system.

9. A computer system comprising:
   a processor; and
   a power-consumption monitor separate from said processor, said processor and said power monitor being coupled to each other so that:
      said monitor can sense power consumption by said processor, and generate power-consumption data representing said power consumption and stores said power-consumption data, time-stamp data, and processor power settings associated with said power consumption data; and
      said processor can read said power-consumption data from said monitor.

10. A computer system as recited in claim 9 wherein said monitor time-stamps said power-consumption data, and said processor reads time-stamped power-consumption data from said monitor.

11. A computer system as recited in claim 10 further comprising a daughterboard that mates with a host computer via a socket on a motherboard of said host computer, said processor and said monitor both mounted on said daughterboard.

12. A computer system as recited in claim 11 wherein said daughterboard includes conductors through which said processor and said monitor communicate.

13. A computer system as recited in claim 12 wherein said monitor issues a warning in the form of a processor interrupt when said power consumption data meets a warning criterion, said processor providing for writing said criterion to said monitor and reading said power-consumption data from said monitor.

14. A computer system as recited in claim 13 further comprising a voltage regulator for regulating voltages provided to said processor, said voltage regulator including said monitor.

* * * * *